United States Patent [19]

Kumazaki

[11] Patent Number: 5,364,315

[45] Date of Patent: Nov. 15, 1994

[54] V-RIBBED BELT

[75] Inventor: Toshimi Kumazaki, Hyogo, Japan

[73] Assignee: Mitsuboshi Belting Ltd., Kobe, Japan

[21] Appl. No.: 61,916

[22] Filed: May 14, 1993

[30] Foreign Application Priority Data

May 18, 1992 [JP] Japan .................................. 39831[U]

[51] Int. Cl.$^5$ ................................................ F16G 5/20
[52] U.S. Cl. ................................... 474/242; 474/265
[58] Field of Search ............... 474/237, 240, 242, 249, 474/252, 265

[56] References Cited

U.S. PATENT DOCUMENTS

| | | | |
|---|---|---|---|
| 1,550,983 | 8/1925 | Pratt | 474/252 |
| 2,023,421 | 12/1935 | Heyer | 474/252 |
| 2,557,095 | 6/1951 | Gingras | 474/265 X |
| 3,851,535 | 12/1974 | Presentey | 474/237 X |
| 4,330,287 | 5/1982 | Fischer | |
| 4,525,158 | 6/1985 | Tanaka et al. | 474/252 X |
| 4,530,684 | 7/1985 | Miranti | 474/265 X |
| 4,647,278 | 3/1987 | Hull | |
| 4,661,088 | 4/1987 | Tangorra | 474/237 |
| 4,840,607 | 6/1989 | Hitchcock et al. | |
| 4,904,232 | 2/1990 | Kitahama et al. | |

FOREIGN PATENT DOCUMENTS

| | | |
|---|---|---|
| 0349434 | 1/1990 | European Pat. Off. |
| 62-179449 | 11/1987 | Japan |
| WO9116551 | 10/1991 | WIPO |

Primary Examiner—Roger J. Schoeppel
Attorney, Agent, or Firm—Wood, Phillips, VanSanten, Hoffman & Ertel

[57] ABSTRACT

An improvement in a power transmission belt of the type having at least one longitudinally extending rib with a side surface to engage a drive surface on a pulley. The side surface has at least a portion that is convex with a curvature at least approximated by an arc of a circle with a radius having a center at a point outside of the one rib.

25 Claims, 3 Drawing Sheets

V-RIBBED BELT

BACKGROUND OF THE INVENTION

1. Field of the Invention

This invention relates to power transmission belts and, more particularly, to a power transmission belt having laterally facing, pulley-engaging side surfaces that are at least partially convex to thereby improve the drive characteristics of the belt, particularly with respect to small diameter pulleys.

2. Background Art

V-ribbed belts have a wide range of applications. V-ribbed belts are preferred over other types of power transmission belts, such as flat power transmission belts, due to the increased surface contact area that is established between the belts and cooperating drive/driven pulleys.

However, V-ribbed belts have some inherent drawbacks. One problem arises when the belt is trained around a small diameter pulley. As the belt wraps around the pulley, the ribs on the belt deform in such a manner that they become effectively thinner and the angle of the pulley-engaging side surfaces is reduced. The result of this is that the contact area between the belt and small diameter pulley is reduced, thus altering the drive characteristics of the belt and potentially causing uneven wear on the belt. The belt ribs may seat differently in the small diameter pulley. Loading on the belt is thus varied. The end result could be a reduction in the belt tension and power transmission capability. Another problem attributable to the change in the angle of the pulley-engaging side surfaces is that there is a tendency of the belt to slip, which generates unwanted noise.

Several solutions to the above problem have been attempted in the prior art. One such attempted solution is to make the angle of the pulley-engaging side surfaces slightly greater than that of the V-shaped groove of a cooperating pulley to accommodate the change in angle due to the wrapping of the belt around small diameter pulleys. Since the change in angle that may result from the bending of the belt may be significant, the angle would have to be increased substantially to accommodate this change in belt shape. While this modification to the belt will accommodate the small diameter pulleys, the cooperating grooves in the other pulleys would have to be similarly modified to permit the desired seating for the belt throughout a system. Consequently, this change solves one problem but introduces another.

A further attempted solution to the above problem has been to round the ends of the teeth, with there being a straight section therebetween. While this reduces the deformation at the end of the rib, that portion of the rib between the ends is still significantly deformed, which compromises the seating of belt in the pulley, particularly in the case of a V-ribbed belt.

A further attempted solution in the prior art has been to form a portion of the side surface of a rib by an arc which is centered at a point within the rib. The problem with this construction is that while it reduces the amount of change in the rib angle due to bending of the belt, the amount of contact area between the belt and pulley is often detrimentally reduced. In other words, the shape of the side surfaces of the ribs is so much different than the cooperating surface on the belt that the belt does not effectively seat.

SUMMARY OF THE INVENTION

The present invention is specifically directed to overcoming the above enumerated problems in a novel and simple manner.

In one form of the invention, an improvement is provided in a power transmission belt of the type having at least one longitudinally extending rib with a side surface to engage a drive surface on a pulley. The side surface has at least a portion that is convex with a curvature at least approximated by an arc of a circle with a radius having a first center at a point outside of the one rib.

A fairly gentle curve is produced on the pulley-engaging side surface of the belt rib. Resultingly, a significant area of the belt side surface is kept in contact with a wide range of pulley diameters, even when the rib angle varies, as when the belt wraps tightly around a small diameter pulley. Consequently, the angle of the V-shaped grooves in the pulleys can be kept consistently at a 40° angle as specified by international standards, such as JASO, SAE and RMA. A single construction of belt can be used effectively in a system, such as a serpentine drive belt system, which has a plurality of different size pulleys, each having a 40° groove angle. Consequently, the drive characteristics of a belt in such a system are consistent from one pulley to the next which allows for uniform belt tension, high power transmission capability, and minimal noise generation resulting from belt slippage.

More specifically, when the ribs of the improved power transmission belt are wrapped around a small diameter pulley, the rib deforms so that the rib angle at the top of the rib is reduced. The rib thus becomes thinner. With the curved surface on the inventive belt, the convex portions thereof flatten to compensate for this thinning attributable to the reduction in the rib angle at the top of the ribs. The result is that an adequate contact area remains between the belt and pulley, thus avoiding both reduction in contact area and localized high pressure contact between the belt and pulley. This avoids uneven pressure application on the belt so as to prolong its life, maintains a constant belt tension, and avoids slippage between the belt and pulley.

In one form, the rib has an inside end and an outside end and the convex surface extends at least one half the distance between the inside and outside ends of the one rib. Preferably, the convex surface extends along the laterally facing surface at that portion midway between the inside and outside ends of the rib. The arc has a center and a first radius which, in one form, is between 4 and 6 mm.

In one form, the one rib is V-shaped. The V-shaped rib has laterally oppositely facing side surfaces. The center of the arc may reside both laterally outside of the rib and outside of the outside end of the V-shaped rib.

In one form, the power transmission belt is a V-ribbed belt.

In one form, the inside end of the rib has an inwardly facing base surface with at least a portion of at least one of the side and base surfaces defined by an arc of a circle with a second center that resides within the one rib. In one form, the arc defining the portion of the at least one of the side and base surfaces connects to the convex portion of the side surface. The radius of the arc defining at least a portion of at least one of the side and base surfaces may be between 0.5 and 1 mm.

The inwardly facing base surface can be defined by arcs of first and second circles with the first and second circles having spaced centers.

The rib has a root surface at the outside end of the rib with the root surface having at least a portion that is curved and connected to the convex portion of the side surface. The curved root surface may be defined by an arc of a circle on the order of, for example, 0.15 mm.

The invention further contemplates a V-ribbed power transmission belt having a plurality of longitudinally extending, laterally spaced V-shaped ribs, with there being first and second ribs having laterally facing surfaces-to engage facing surfaces on a drive pulley. The laterally facing surfaces on each rib have at least a portion thereof that is convex and a curvature at least approximated by an arc with a radius centered at a point outside each of the ribs.

The invention further contemplates the above belt in combination with a pulley having flat, laterally facing side surfaces to engage the convex portions of the surfaces on the ribs.

Still further, the invention contemplates the combination of the abovedescribed power transmission belt with a system including a drive pulley, a driven pulley, and an auxiliary machine pulley, with the belt trained around the drive, driven and auxiliary machine pulleys. In one exemplary form, the drive pulley has a diameter of 120 to 160 mm, the driven pulley a diameter of 40 to 70 mm, and the auxiliary machine pulley a diameter of 90 to 180 mm.

The auxiliary machine can be, for example, an air compressor. In one form, there is a clutch between the air compressor and the auxiliary machine pulley.

The invention further contemplates the combination of the above-described power transmission belt system with at least first and second pulleys, with the belt trained around the first and second pulleys. At least one of the first and second pulleys is driven, with there being structure for varying the load on the power transmission belt as the power transmission belt is operated.

DETAILED DESCRIPTION OF THE DRAWINGS

Figure 1:
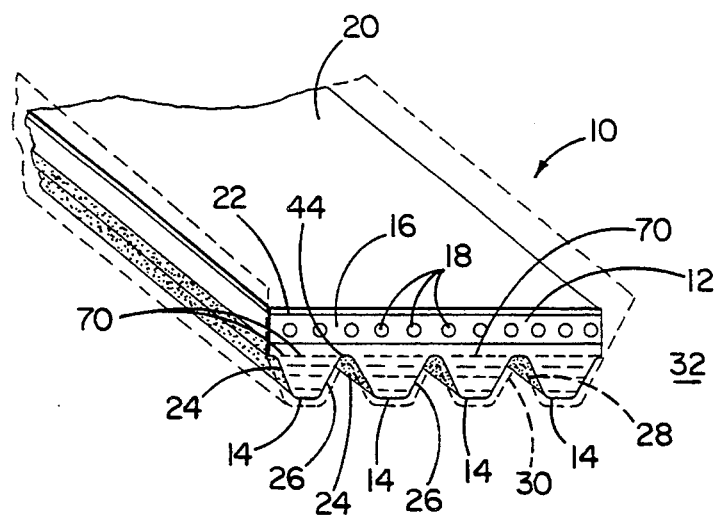
FIG. 1 is a perspective view of a portion of a V-ribbed belt according to the present invention.
Figure 2:
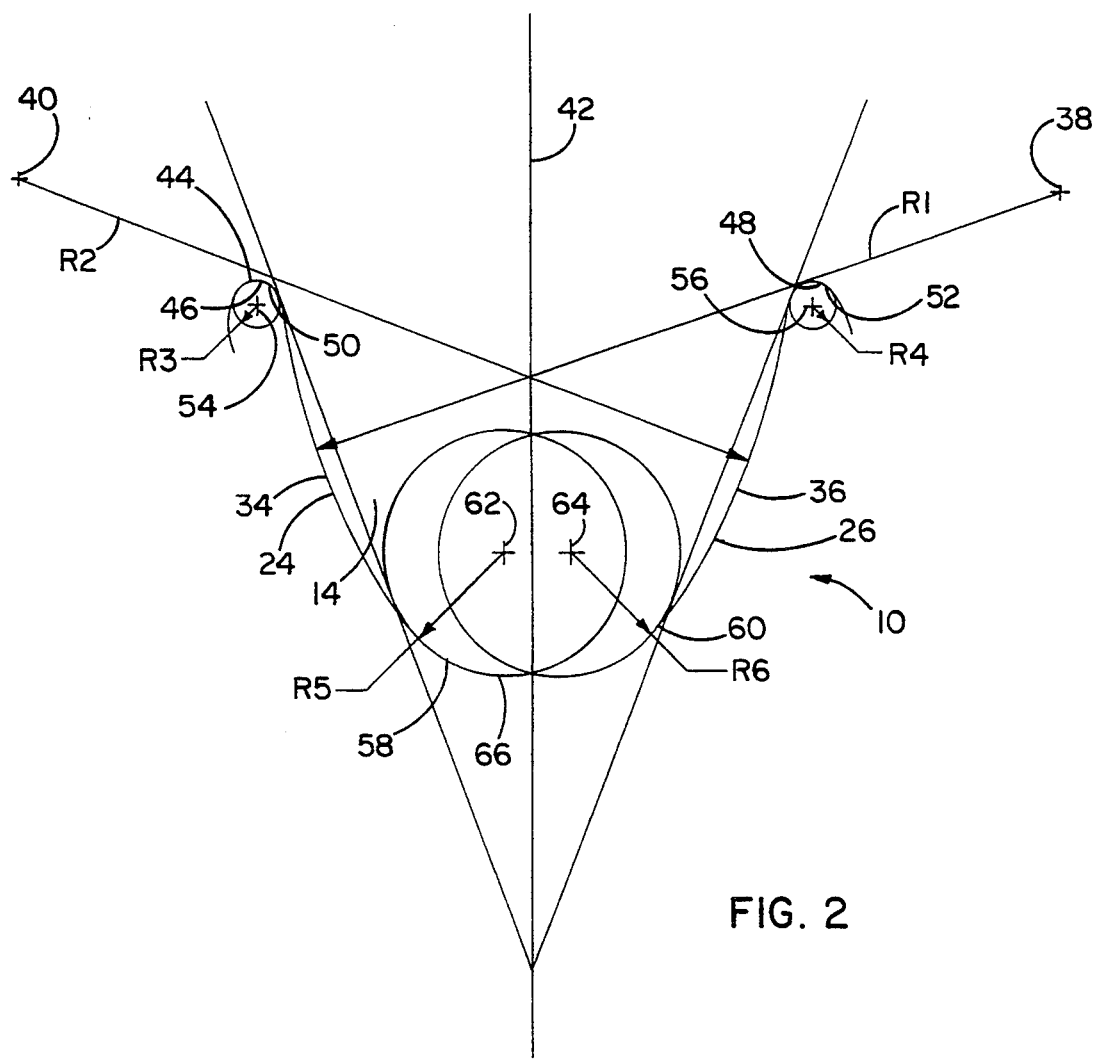
FIG. 2 is an enlarged, cross-sectional view of one of the ribs on the belt in FIG. 1.

In FIGS. 1 and 2, one form of V-ribbed belt, according to the present invention, is shown at 10. It should be understood that the inventive concept can be employed in all types of power transmission belts, i.e. V-belts, V-ribbed belts, etc. The invention, however, is particularly useful in the more flexible V-ribbed belt.

The belt 10 has a flat body 12 and a plurality of laterally spaced, V-shaped ribs 14, which are integrally formed on the inside of the belt body 12. The ribs 14 extend continuously in the longitudinal direction of the belt 10. While four such ribs 14 are shown, any number of ribs are contemplated by the present invention.

The belt body 12 has a cushion rubber layer 16 within which a plurality of longitudinally extending, load carrying cords 18 are embedded. The cords 18 are made in any of a number of different ways, but must exhibit good strength with limited elongation. At least one rubber coated canvas layer 20 is adhered to the outside surface 22 of the layer 16.

Each rib 14, as seen in FIGS. 1 and 2, can be made from the same material as the cushion rubber layer 16. Each rib 14 has laterally oppositely facing side surfaces/flanks 24, 26 which are arranged to engage facing surfaces 28, 30 on a pulley 32 which receives the belt 10.

Each surface 24, 26 has at least a portion 34, 36, that is convex. The surfaces 34, 36 each are at least approximated by the arc of a circle with a radius centered outside of the rib 14 on which they reside. In a preferred form, the curvature of the surfaces 34, 36 is defined by arcs centered on points 38, 40, which are equidistantly spaced from the vertical axis 42 bisecting the rib 14. The centers 38, 40 reside outside of the outside end 44 of the rib 14 and laterally outside of the side surfaces 34, 36. In an exemplary form, the radii R1, R2 for the arcs defining the surfaces 34, 36 are between 4.0 and 6.0 mm.

The outside end 44 of each rib 14 has roots 46, 48 defined by concave surfaces 50, 52, which connect to the convex surfaces 34, 36, respectively. The concave surfaces 50, 52 are defined by circular arcs with radii centered on points 54, 56, which reside outside of the rib 14. In an exemplary embodiment, the radii R3, R4 are on the order of 0.15 mm.

The inside ends of the surfaces 34, 36 connect to arcuate surfaces 58, 60 defined by radii R5, R6 centered on points 62, 64, which are laterally spaced from each other and reside within the rib 14. The radii R5, R6 are preferably in the range of 0.5–1.0 mm. The surfaces 58, 60 meet to define an inwardly facing base surface 66 on the rib 14. Thus the rib 14 is rounded at the inside end thereof.

Although the inside base surface 66 is shown to be defined by a pair of arcuate surfaces 58, 60, the surface 66 can be defined by a single arc with a larger radius of curvature. However, the definition of the base surface 66 by two arcs is preferred in that it facilitates flattening of the rib side surfaces 34, 36 in use.

The ribs 14 have short fibers 70 embedded therein and oriented so that the lengths thereof extend in a lateral direction. These fibers may be made of nylon, vinylon, polyester, aromatic polyamide, cotton, pulp, or a mixture thereof.

Tests were conducted comparing the performance of the V-ribbed belt according to the present invention and a conventional V-ribbed belt. Table 1, below, sets out the dimensions of the inventive belt and the conventional belt compared thereto. The conventional belt is of the type referred to above in the Background Art section and has flanks defined by straight surfaces.

TABLE 1

|  | Type | Rib height (mm) | Curve radius at inside rib end (mm) | Curve radius at rib root (mm) | Flank (side surface) |
| --- | --- | --- | --- | --- | --- |
| Inventive Belt | Type K | 2.5 | 0.8 | 0.15 | R = 5 mm |
| Conventional Belt | Type K | 2.7 | 0.7 | 0.15 | straight |

Figure 3:
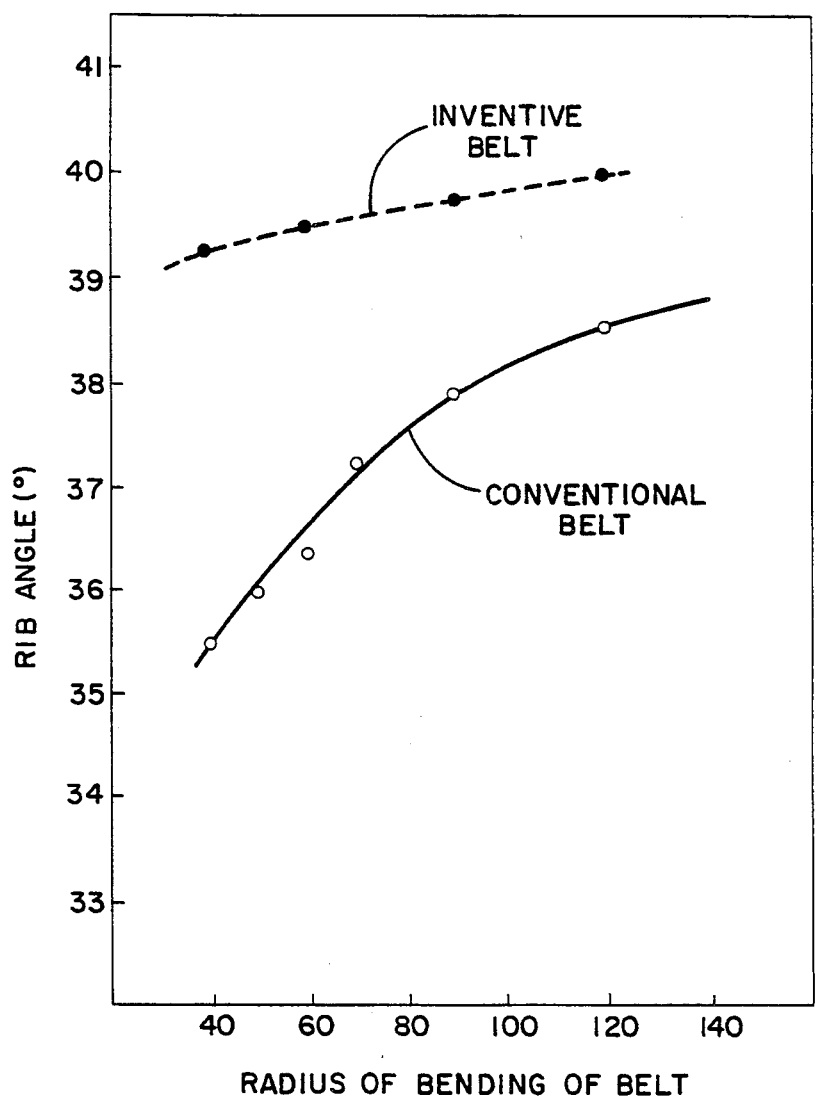
FIG. 3 is a graph comparing the variation in rib angle for a prior art belt and the inventive belt over a range of pulley diameters around which the belt is wrapped.

The belts were tested by training the belts around pulleys with different diameters to determine the change in the angle of the side surfaces of the belt ribs in a static bending environment. The results are shown in the graph of FIG. 3.

It can be seen from this graph that the inventive belt exhibited a very small change in the belt rib angle in response to an increase in the bending angle, whereas the conventional belt tested had a significantly larger change in the belt angle.

Figure 4:
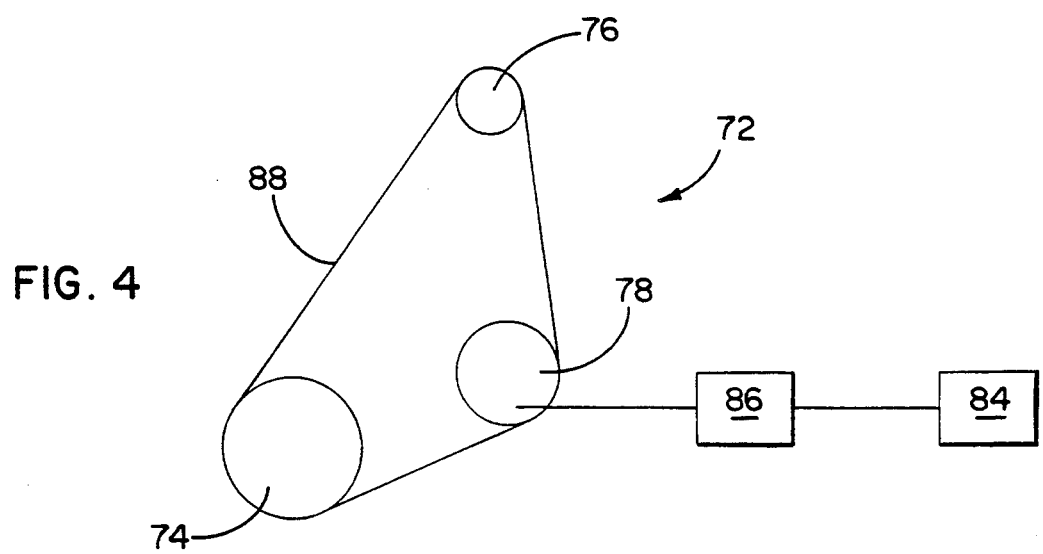
FIG. 4 is a schematic representation of a system used to run a belt to measure the point at which noise generating slip occurs.
Figure 5:
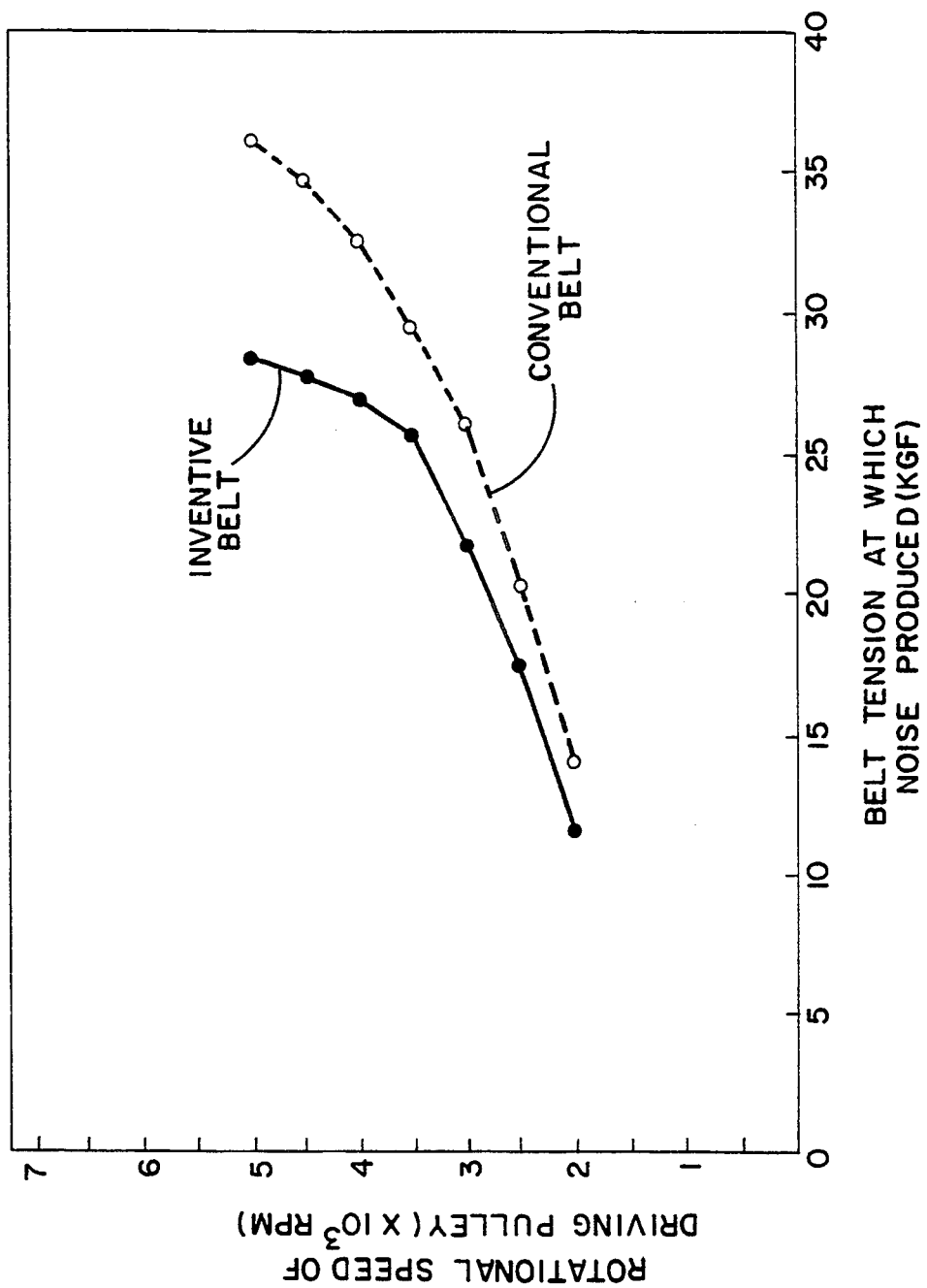
FIG. 5 is a graph identifying the point at which slip noise is generated for both a prior art belt and the inventive belt over a range of tension on the belts at different rotational speeds for a driving pulley for the belts.

The belts were then tested for noise generation on a test set-up as shown at 72 in FIG. 4. The test set-up 72 consists of a drive pulley 74, with a 120 mm diameter, a driven pulley 76, with a 60 mm diameter, and an auxiliary machine pulley 78, having a diameter of 95 mm. Slip noise was measured for each of the inventive conventional belts while varying the rotational speed of the driving pulley. The results of this test are shown in the graph in FIG. 5.

From this graph, it can be seen that the lower limit of belt tension which does not cause generation of slip noise is much smaller for the inventive belt than with the conventional belt. This is due to the fact that the resistance at the end of the V-shaped rib when the belts slip is small. More specifically, it was determined that a difference of 7.8 kgf in tension exists between both belts when the driving pulley operates at 5,000 rpm.

One exemplary dynamic system for testing belts uses the same arrangement as the test set-up 72. The drive pulley 74 has a diameter of 120–160 mm. The driven pulley 76 has a diameter of 40–70 mm. The auxiliary machine pulley 78 is provided on an air compressor 84, with there being a clutch mechanism 86 between the air compressor and the pulley 78. The pulley 78 has a diameter of 90–180 mm. A K-type belt 88 according to the invention is trained around the pulleys 74, 76, 78 and may be, for example, a 4PK870 V-ribbed belt. The clutch 86 can be controlled to develop a variable inertial load as the driven pulley 74 is rotated.

In such a system, the critical tension, i.e. that at which noise is generated, can be measured. When the belt is highly tensioned, there is no significant noise generation. When the belt tension is reduced to a certain level, significant noise is generated. A graph, similar to that in FIG. 5, can be developed by altering belt tension through the clutch 86 and by varying the speed of the drive pulley 74.

The foregoing disclosure of specific embodiments is intended to be illustrative of the broad concepts comprehended by the invention.

I claim:

1. An improved power transmission belt of the type having at least one longitudinally extending rib with a side surface to engage a drive surface on a cooperating pulley, the improvement comprising:
   said rib side surface having at least a portion that is convex with a curvature at least approximated by a first arc with a radius having a first center at a point outside of said at least one rib, said convex surface portion being engagable with a drive surface on a pulley.

2. The improved power transmission belt according to claim 1 wherein the at least one rib has an inside and an outside end and the convex surface extends over at least one half the distance between the inside and outside ends of the at least one rib.

3. The improved power transmission belt according to claim 1 wherein the first arc has a first radius that is between 4 and 6 mm.

4. The improved power transmission belt according to claim 1 wherein the at least one rib is V-shaped.

5. The improved power transmission belt according to claim 4 wherein the at least one V-shaped rib has laterally oppositely facing side surfaces and the center of the first arc is spaced laterally from the at least one V-shaped rib.

6. The improved power transmission belt according to claim 4 wherein the at least one rib has an inside end and an outside end, and the first center resides outside of the outside end of the V-shaped rib.

7. The improved power transmission belt according to claim 1 wherein the power transmission belt is a V-ribbed belt having a plurality of longitudinally extending ribs.

8. The improved power transmission belt according to claim 1 wherein the at least one rib has an inside end and an outside end and the inside end has an inwardly facing base surface and at least one of the base surface and rib side surface has at least a portion thereof defined by a second arc of a circle with a second center that is spaced from the first center.

9. The improved power transmission belt according to claim 8 wherein the second center resides within the at least one rib.

10. The improved power transmission belt according to claim 8 wherein the arc defining the portion of the at least one of the base surface and rib side surface connects to the convex portion of the side surface.

11. The improved power transmission belt according to claim 1 wherein the at least one rib has an inside end and an outside end, there is a root surface defined at the outside end of the at least one rib, said root surface having a portion that is curved and the curved portion of the root surface is connected to the convex portion of the side surface.

12. The improved power transmission belt according to claim 1 wherein the at least one rib has an inside end and an outside end and the inside end of the at least one rib has an inwardly facing base surface having at least a portion thereof defined by arcs of third and fourth circles with the third and fourth circles having spaced centers.

13. A V-ribbed power transmission belt comprising:
   a plurality of longitudinally extending, laterally spaced V-shaped ribs,
   there being a first and second of said ribs having laterally facing surfaces to engage facing surfaces on a cooperating pulley, said laterally facing surfaces on each said first and second rib having at least a portion thereof that is convex with a curvature that is at least approximated by a first arc with a radius having a first center at a point outside of each said rib.

14. The V-ribbed power transmission belt according to claim 13 wherein the first and second fibs each have an inside end and an outside end and the convex portions of the laterally facing surfaces extend along the laterally facing surfaces midway between the inside and outside ends of the first and second ribs.

15. The V-ribbed power transmission belt according to claim 13 wherein the convex surface portions are each defined by an arc of a circle having a radius between 4 and 6 mm.

16. The V-ribbed power transmission belt according to claim 13 wherein the first and second ribs each have an inside end and an outside end and each inside end has an inwardly facing base surface having at least a portion thereof defined by a second arc of a circle with a center and the radius of the second arc is between 0.5 and 1.0 mm.

17. The V-ribbed power transmission belt according to claim 13 wherein the ribs each have an inside end and an outside end, the center of one of the arcs defining the convex portions of one laterally facing surface on one of the first and second ribs is located outside of the outside end of the one of the first and second ribs.

18. The V-ribbed power transmission belt according to claim 13 wherein the first and second ribs each have an inside end and an outside end, there is a root surface defined at the outside end of each of the first and second fibs, said root surfaces being concave.

19. The V-ribbed power transmission belt according to claim 18 wherein at least one of said root surfaces is defined by an arc with a radius of approximately 0.15 mm.

20. The V-ribbed power transmission belt according to claim 13 in combination with a pulley having flat, laterally facing side surfaces to engage the convex portions of the surfaces on the first and second ribs.

21. The V-ribbed power transmission belt according to claim 13 in combination with a system including a drive pulley, a driven pulley and an auxiliary machine pulley, and the V-ribbed power transmission belt is trained around the drive, driven and auxiliary machine pulleys.

22. The combination according to claim 21 wherein the drive pulley has a diameter of 120–160 mm, the driven pulley has a diameter of 40–70 mm, and the auxiliary machine pulley has a diameter of 90–180 mm.

23. The combination according to claim 21 including an auxiliary machine that is an air compressor, there being a clutch between the air compressor and the auxiliary machine pulley.

24. The V-ribbed power transmission belt according to claim 13 wherein said V-ribbed power transmission belt is a K-type belt.

25. The V-ribbed power transmission belt according to claim 13 in combination with a system including at least first and second rotatable pulleys with the V-ribbed power transmission belt trained around the first and second pulleys, there being means for driving at least one of the first and second pulleys and means for varying the load on the V-ribbed power transmission belt as the V-ribbed power transmission belt is operated.

* * * * *